Oct. 23, 1928.

E. J. PALMER

FLOAT VALVE

Filed Sept. 30, 1926

1,688,876

INVENTOR
ELI J. PALMER
by R. S. Burry
ATTORNEY

Patented Oct. 23, 1928.

1,688,876

UNITED STATES PATENT OFFICE.

ELI J. PALMER, OF LOS ANGELES, CALIFORNIA, ASSIGNOR TO CALIFORNIA PRODUCTION COMPANY, OF LAS VEGAS, NEVADA, A CORPORATION OF NEVADA.

FLOAT VALVE.

Application filed September 30, 1926. Serial No. 138,662.

This invention relates to improvements in float valves and more particularly to such valves as are employed in flush tanks for toilet bowls.

Float valves are now constructed in many different shapes and of many different materials and common to all of them is the attempt to effect a relatively great area of contact between the valves and valve seat, with the result that such valves provide lodgement for foreign matter, either on the face of the valve, or on the face of the valve seat, which prevents perfect sealing engagement between the valve and seat. Imperfect sealing of the valve on its seat permits water to leak and produces undesirable noises.

In all such valves the valve seat is of conical shape and formed at the intake end of the flush pipe and the valves formed either as solid bodies of globular or conical shape and of buoyant material such as wood or cork; or formed as hollow sheet-metal balls. The wood or cork valves are of relatively short life for the reason that they become saturated or "water logged" and are then no longer operative; the hollow sheet metal type is not effective because it can not conform to the valve seat. Many expedients have been resorted to for the purpose of rendering the wood or cork bodies impervious to water to prolong their lives, and many other expedients employed to render the metallic hollow balls conformable to the valve seats, but due to the fact that the engaging surfaces are relatively large, foreign matter lodges and prevents leak tight engagement. Other forms of valves have been made of bodies of cellular sponge rubber, with the idea of valve conformation with the seat, but such valves are objectionable because they too become saturated and wear rapidly hence have relatively short lives. Still other forms of valves are formed as hollow balls of rubber, which are buoyant, conformable to the valve seats but which require long surface contact with the seat hence provide lodgement of foreign matter, are objectionable because of short life due to perforation by wear of the necessarily thin walls, and are further objectionable due to softening and swelling by water action.

Due to the fact that the flush pipes are made in different sizes, or capacities, the diameter of the valve seats vary, thereby requiring that several sizes of valves must be furnished which entails an item of no little expense and is the source of much confusion.

In all of the various recited forms of valves there are rigid, nonflexible connections between the valves-proper and their pull-rods which, in the event of a misshapen, or bent, pull-rod, which is common, due to strains incident to the action and forces of water in the flush tank, hold the valve out of line with the valve seat and prevent the establishment of a leak-tight fit.

Among the objects of my invention is to provide a valve, constructed of material, which is impervious to water, to the end that it will not become saturated; which is highly elastic and flexible so as to conform readily to a valve seat; which is provided with an open ended cavity to provide buoyancy; which is of frusto-conical shape for adaption to seats of varying diameters; which provides a water seal, by water pressure, over the crown, or rim of the valve seat and which requires a minimum of engaging surface with the valve seat.

My improvements consist in the novel construction, arrangement and combination, as hereinafter fully, clearly and concisely described, definitely pointed out in my claims and illustrated by the accompanying drawing in which—

Figure 1:
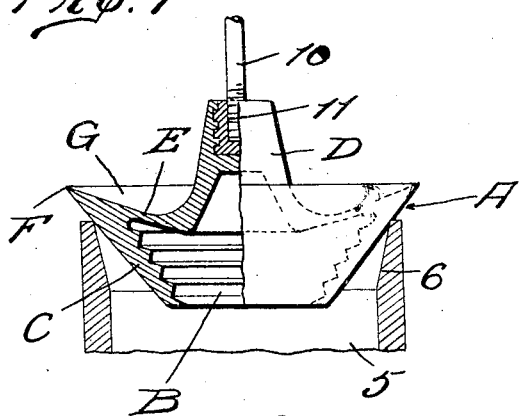
Fig. 1, is an elevation, partly in section, of a valve constructed in accordance with my invention, as related to a valve seat, when simply rested thereon.
Figure 3:
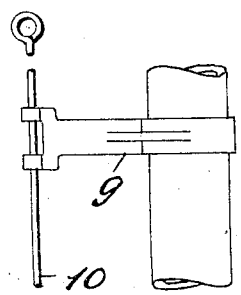
Fig. 3, shows the valve as applied for use.
Figure 3:
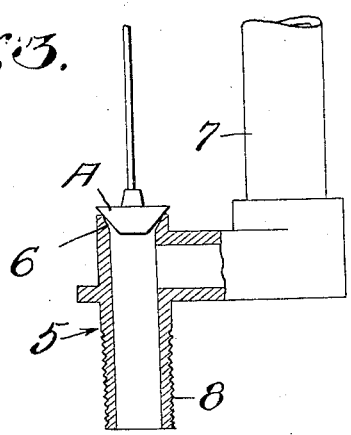
Figure 2:
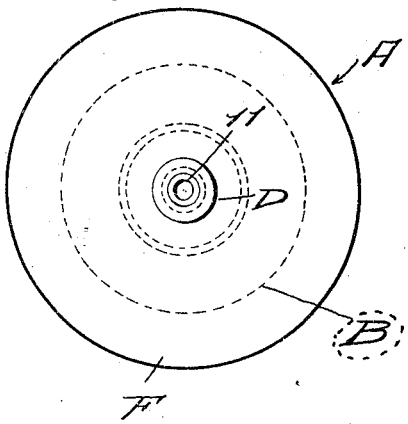
Fig. 2, is a plan view of the valve.

Referring more specifically to the drawing, 5 designates the fitting, including the valve seat 6, which is connected with the overflow pipe 7, and flush pipe connection 8. Carried by the overflow pipe is a guide 9, through which a pull rod 10 is slidably secured for the operation of a valve A, relative to the valve seat 6.

The valve A and the pull-rod 10 shown, are my contribution to the art, the other of the recited elements, or parts, are, or may be, of any standard, conventional, or approved construction, or design, and except as related to my valve and pull-rod constitute no part of my invention.

The valve A is formed preferably, by molding of elastic yielding material, preferably Pará rubber and its body is frustrum or truncated cone shaped, in which a cavity B is formed, to provide buoyancy, whereby to form a wall C, including the periphery, or valve seat engaging point, which is relatively thin, and highly elastic.

Concentrically disposed, and extending axially relative to the body is a stem D, which is connected with the wall C by a thin flexible diaphragm E which with the wall C, forms a continuous circular lip F at the upper margin of the valve body.

The upper surface of the diaphragm is dished to produce a trough-shaped, water pressure-pocket G, between the lip F and the stem D and the lower surface of the diaphragm is substantially parallel with that portion of the upper surface lying between the lip and stem whereby to provide for axial, angular and rotational movement of the stem portion of the valve, relative to the valve seat engaging portion (the wall C).

The wall C, lip F, diaphragm E, and stem D are by preference formed as an integral unit, with the cavity B open-ended at its bottom and the stem carrying a metallic element including means such as internal screw-threads 11, for connection with the pull-rod 10.

Ordinarily such pull-rods are constructed of brass, or iron while I prefer to employ aluminum by which expedient I reduce resistance to flotation of the valve, as required to hold the valve open for discharge of the tank charge.

In Fig. 1 the valve is shown as in a position just resting on the crown, or rim, of the valve seat and it is to be observed that the pitch of the face of the valve differs from the pitch of the valve seat face so that there is only a line engagement between the valve and seat as distinguished from long surface engagement common to the ordinary cone-valves.

The body of the valve is formed of frusto conical shape of a pitch substantially greater than the pitch of the frusto conical axial passage through the valve seat 6. The diameter of the body of the valve at its upper end is substantially greater than the diameter of the upper end of the largest valve seat commonly used, and the diameter of the body of the valve at its lower end is substantially smaller than the diameter of the smallest valve seat commonly used. The forming body of the valve of substantially greater pitch than the pitch of the frusto conical portion of the valve seat 6 insures that the valve will seat on any size valve seat that is commonly used in a line contact around the periphery of the valve even though the valve stem D and pull-rod 10 are not accurately aligned with the longitudinal axis of the valve seat 6. The body of the valve having a relatively thin flexible diaphragm wall E permits the stem D to have a substantially universal motion relative to the body of the valve so that even though the pull-rod 10 may be bent or twisted out of alignment with the longitudinal axis of the valve seat 6, the valve will seat accurately on a line contact preventing leaking of water between the valve and seat no matter what position the valve is pulled by the suction of the water passing through the valve seat 6 to engage the valve seat 6.

An important additional advantage of the diaphragm is that the valve body may move in all directions relative to its guide and pull-rod so that no matter how the guide and pull-rod direct the valve body it may by reason of the flexible connection adapt itself to conformity with the valve seat.

I claim:—

1. The combination with a valve seat having a frusto conical axial passage of a valve having frusto conical body of substantially lesser pitch than said frusto conical axial passage, the valve being formed of flexible material and being open at its lower end, a diaphragm wall at the upper end of said valve body of substantially thinner material than the adjacent portions of the valve, a stem formed integral with said diaphragm wall and a pull-rod secured to said stem, the said thin diaphragm wall permitting said stem and pull-rod to have a universal movement relative to said body.

2. The combination with a valve seat having a frusto conical axial passage of a valve having a frusto conical body of substantially lesser pitch than said frusto conical axial passage, the valve being formed of flexible material and being open at its lower end, a diaphragm wall at the upper end of said valve body of substantially less thickness than the adjacent portions of said valve to provide a universal movement between the valve and stem, a stem formed integral with said diaphragm wall and a pull-rod secured to said stem.

3. The combination with a valve seat having an axial passage of a valve having a frusto conical body of relatively great pitch, the valve being formed of flexible material, a diaphragm wall at the upper end of said body of relatively thin material to the adjacent portions of the valve, a stem formed integral with said end diaphragm wall and a pull-rod secured to said stem, the said thin diaphragm wall permitting said stem and pull-rod to have a substantially universal movement relative to said body.

4. A valve of the character described, comprising a flexible side wall, a flexible top wall, and pull rod connecting means centrally of said top wall; said top wall having an annular portion encircling the pull rod connecting means of greater flexibility than said side wall to provide a universal movement between the valve and stem.

In testimony I have affixed my signature.

ELI J. PALMER.